G. HOMMEL, E. KANDLER & W. L. PATTERSON.
SUPPORTING DEVICE.
APPLICATION FILED OCT. 28, 1913.
1,208,965.
Patented Dec. 19, 1916.
2 SHEETS—SHEET 1.
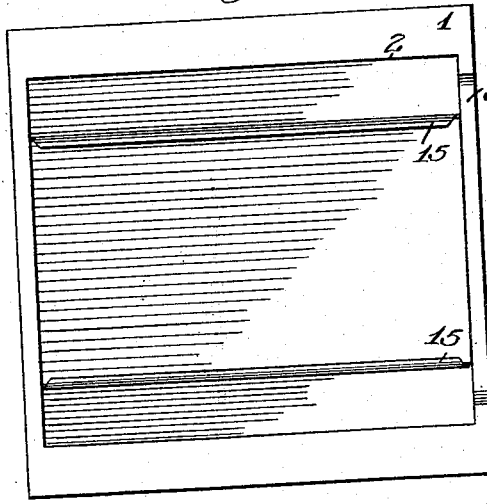
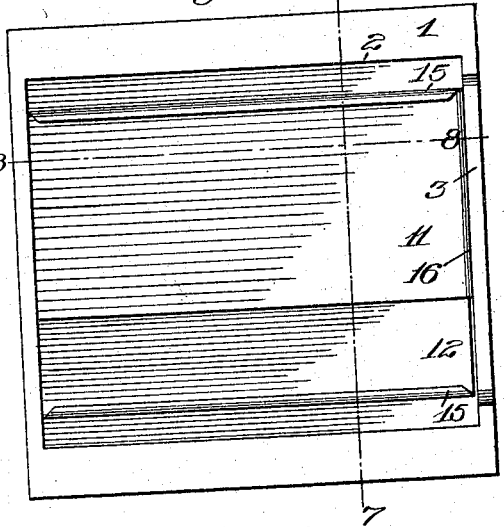
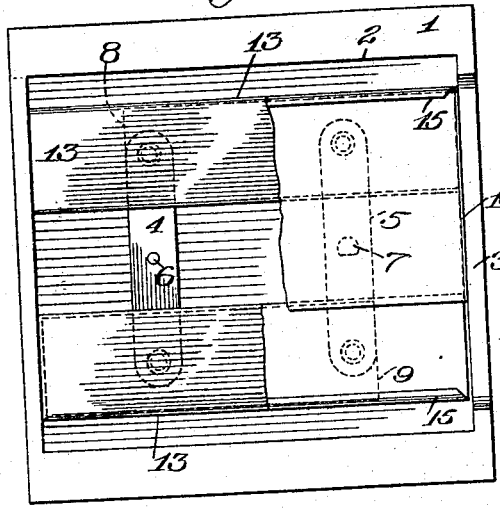
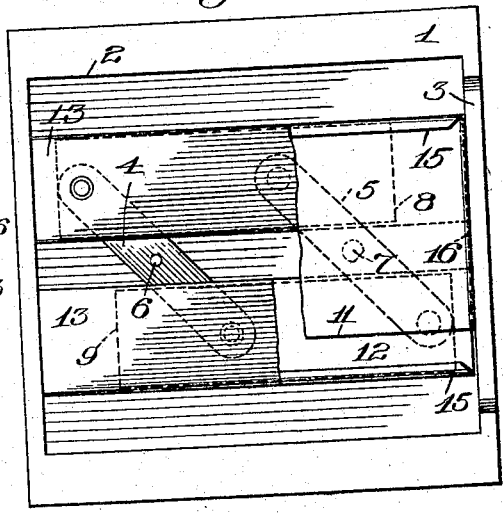
Inventors
George Hommel
Edmund Kandler
William L. Patterson G. HOMMEL, E. KANDLER & W. L. PATTERSON.
SUPPORTING DEVICE.
APPLICATION FILED OCT. 28, 1913.
1,208,965.
Patented Dec. 19, 1916.
2 SHEETS—SHEET 2.
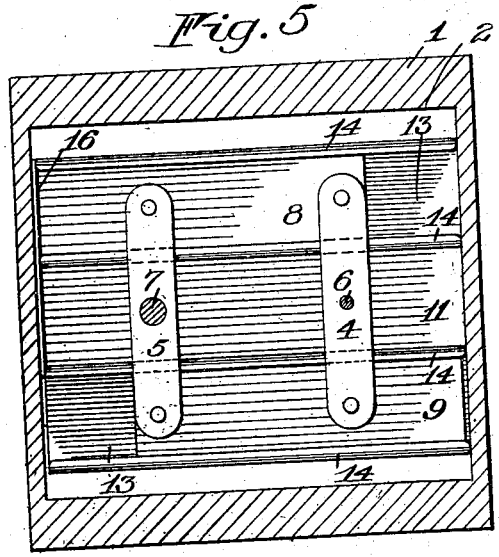
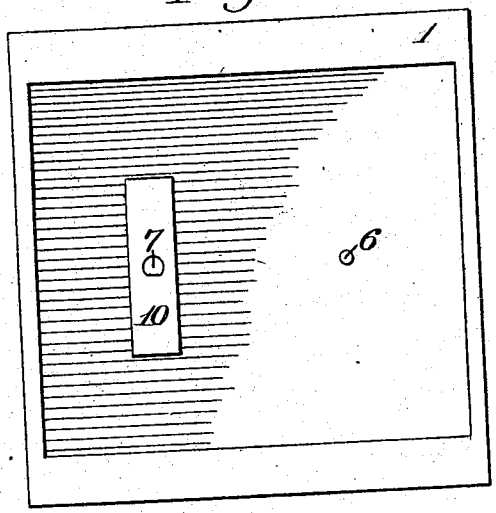
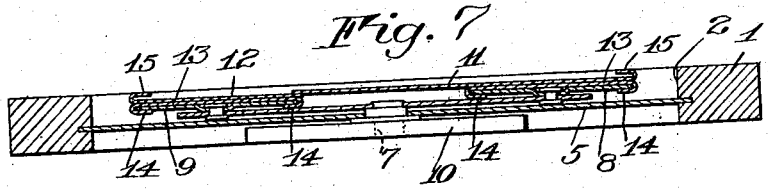
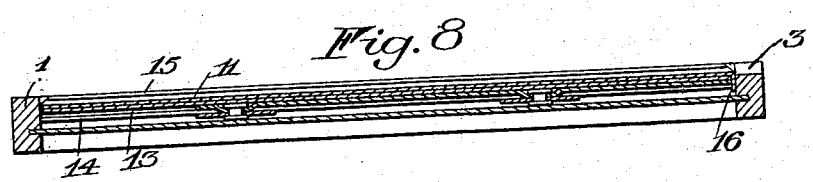
Witnesses
Walter B Payne
Nelson H. Copp
Inventors
George Hommel
Edmund Kandler
William L. Patterson
By Church & Rich
their Attorneys

UNITED STATES PATENT OFFICE.

GEORGE HOMMEL, EDMUND KANDLER, AND WILLIAM L. PATTERSON, OF ROCHESTER, NEW YORK, ASSIGNORS TO BAUSCH & LOMB OPTICAL COMPANY, OF ROCHESTER, NEW YORK, A CORPORATION OF NEW YORK.

SUPPORTING DEVICE.

1,208,965.  Specification of Letters Patent.  Patented Dec. 19, 1916.

Application filed October 28, 1913. Serial No. 797,747.

*To all whom it may concern:*

Be it known that we, GEORGE HOMMEL, EDMUND KANDLER, and WILLIAM L. PATTERSON, all of Rochester, in the county of Monroe and State of New York, have invented certain new and useful Improvements in Supporting Devices; and we do hereby declare the following to be a full, clear, and exact description of the same, reference being had to the accompanying drawings, forming a part of this specification, and to the reference-numerals marked thereon.

Our invention relates to supporting devices for various articles, such as cards, pictures, photographs and other objects, and it has for its object to provide an improved appliance that is of simple construction and can be operated readily to grip an object between a pair of relatively movable jaws or gripping elements.

A further purpose of our improvement is to provide an arrangement of parts that is effective for holding different sized objects, the parts being compactly housed, affording a neat and comparatively inexpensive device that is applicable to different uses.

To these and other ends the invention consists in certain improvements and combinations of parts, all as will be hereinafter more fully described, the novel features being pointed out in the claims at the end of the specification.

In the drawings: Fig. 1 is a front elevation of one embodiment of the invention, as constructed for a projection apparatus; Fig. 2 is a similar view showing the jaws or gripping means separated to receive an object; Fig. 3 is a view similar to Fig. 2, with parts broken away, showing the actuating devices; Fig. 4 is a view similar to Fig. 1 with parts broken away as in Fig. 3; Fig. 5 is a sectional view; Fig. 6 is a rear elevation; Fig. 7 is a transverse sectional view on the line 7—7 of Fig. 2, and Fig. 8 is a horizontal sectional view on the line 8—8 of Fig. 2.

Similar reference numerals throughout the several figures indicate the same parts.

The invention may be carried into effect in a number of different ways, and for the purpose of illustrating one practical form, we have shown an arrangement adapted for holding cards or pictures for employment with projection apparatus, and in the drawings 1 constitutes a frame or support which is recessed at 2, to afford an opening in which the operating parts are housed in a manner that will now be described.

3 designates a cutaway portion or depression in one side wall of the frame, the purpose of which will hereinafter be apparent. Arranged upon the frame 1 are actuating devices, consisting preferably of a pair of links 4 and 5 pivoted at 6 and 7, respectively. The links 4 and 5 are connected for simultaneous movement by means of supporting members 8 and 9, which are arranged on opposite sides of the pivotal points of the links. This affords an arrangement whereby the links are always in parallelism, and the supporting members are also retained in parallelism during their movement from their extreme outer position, as shown in Fig. 3, to their extreme inner position, as shown in Fig. 4, the movements of the supporting members being limited and determined by the walls of the frame. It will be noted that each of the supporting members is shorter than the recess in the frame, to permit limited movement of the supporting members lengthwise of the frame. The lengthwise or longitudinal movement of the supporting members serves to move the jaws or gripping means toward and from each other in the manner that will shortly be made clear. The actuating devices are operated by means of a suitable finger piece 10 fixed on the post 7 which extends through the frame and carries the link 5.

The gripping means or jaws are preferably slidably arranged on the supporting members, so as to permit a relative lengthwise movement between them and the supporting members. This enables the jaws to extend the entire length of the recess 2, and to have the proper movement toward and from each other, necessary for engaging and disengaging an object. To this end, we provide a pair of slides 11 and 12, respectively, one of which preferably overlaps the other, as shown in Fig. 7. In a device such as shown in the present embodiment, the operating parts are preferably constructed of sheet metal which is more or less yieldable, and affords a close engagement between the respective slides, presenting a substantially flat, smooth supporting surface. The slides 11 and 12 carry means for holding them in sliding engagement with the supporting members, such as, for instance, the plates 13, suitably secured to the slides and provided with flanges 14 on the rear faces engaging the edges of the supporting members. The slides are provided on their front sides with coöperating flanges 15 which engage the opposite edges of the card or picture, although it will be understood that any engaging element comprising a part of the gripping means would be the equivalent of the flanges that have just been described. In the normal position of the parts, the ends of the jaws or gripping means engage the adjacent walls of the frame. This prevents endwise movement of the jaws, so that when the actuating links are operated to move the supporting members, the jaws will be moved toward or from each other as the case may be.

For holding an object such as a card, the gripping jaws are first separated, the card being placed between the coöperating engaging flanges, and then the jaws are moved toward each other until the object is engaged by the flanges 15. If for any reason it is desirable to remove the gripping means from engagement with the supporting members, this can be done by slightly lifting the ends of the jaws adjacent to the recess 3 until the flanges 16 are free to move over the edge of the frame.

We claim as our invention:

1. The combination with a frame, of a plurality of actuating devices pivotally mounted on the frame and arranged in parallelism, supporting members connecting the actuating devices, and coöperating gripping means disposed on the supporting members.

2. The combination with a frame, of an actuating device pivotally mounted on the frame, supporting members connected to the actuating device on opposite sides of its pivot, means for retaining the supporting members in parallel arrangement, and coöperating gripping means disposed on the supporting members.

3. The combination with a frame, of a pair of supporting members, actuating means pivotally arranged on the frame and connected with the supporting members for effecting movement thereof, means for retaining the supporting members in parallelism and coöperating gripping means disposed on the supporting members.

4. The combination with a frame, of a pair of actuating links pivoted on the frame, supporting members connecting the ends of the actuating links, slidable gripping devices carried by the supporting members, and means on the frame engaging the gripping devices and preventing endwise movement thereof.

5. The combination with a frame, of a pair of actuating links pivoted on the frame, supporting members connecting the ends of the actuating links, gripping means embodying slides arranged on the supporting members, each of said slides including flanges on its rear face engaging the supporting members and a flange on the front face coöperating with the flange on the other slide to hold a card or other article therebetween.

6. The combination with a plurality of actuating devices arranged in parallelism, of supporting members connecting the actuating devices and adapted to be moved toward and from each other by the actuating devices and coöperating gripping devices mounted on the supporting members.

7. An adjustable card or sheet retainer comprising a plurality of supporting members connected by means for effecting movement of them toward and from each other, and overlapping plates arranged upon and permitting slidable movement of the supporting members longitudinally of the plates and provided with oppositely disposed gripping devices coöperating to retain said card.

8. An adjustable card or sheet retainer comprising a pair of oppositely arranged gripping devices engaging edges of the article to be held, of supporting members on which the gripping devices are mounted to permit longitudinal sliding of the supporting members, and means connecting the supporting members for effecting adjustment thereof toward and from each other.

GEORGE HOMMEL.
EDMUND KANDLER.
WILLIAM L. PATTERSON.

Witnesses:
HENRY C. THON,
WILLIAM G. WOODWORTH.

Copies of this patent may be obtained for five cents each, by addressing the "Commissioner of Patents, Washington, D. C."